United States Patent
Anderson

(10) Patent No.: US 10,005,647 B2
(45) Date of Patent: Jun. 26, 2018

(54) ADAPTATION OF A FRONT WINCH DEVICE ON A VEHICLE TO RAISE A LOAD TO THE REAR OF A VEHICLE

(71) Applicant: Carl L. Anderson, Chicora, PA (US)

(72) Inventor: Carl L. Anderson, Chicora, PA (US)

( * ) Notice: Subject to any disclaimer, the term of this patent is extended or adjusted under 35 U.S.C. 154(b) by 0 days. days.

(21) Appl. No.: 15/139,431

(22) Filed: Apr. 27, 2016

(65) Prior Publication Data

US 2016/0311666 A1 Oct. 27, 2016

Related U.S. Application Data

(60) Provisional application No. 62/153,160, filed on Apr. 27, 2015.

(51) Int. Cl.
| | |
|---|---|
| *B66D 1/36* | (2006.01) |
| *B60P 1/00* | (2006.01) |
| *B66D 1/60* | (2006.01) |
| *B60P 3/00* | (2006.01) |
| *B66D 1/00* | (2006.01) |

(52) U.S. Cl.
CPC ............... *B66D 1/36* (2013.01); *B60P 1/00* (2013.01); *B60P 3/00* (2013.01); *B66D 1/00* (2013.01); *B66D 1/60* (2013.01)

(58) Field of Classification Search
CPC .... B66D 1/00; B66D 1/36; B66D 1/60; B60P 3/00; B60P 1/00
USPC .................................................. 254/323, 394
See application file for complete search history.

(56) References Cited

U.S. PATENT DOCUMENTS

| | | | | |
|---|---|---|---|---|
| 1,345,881 A | * | 7/1920 | Purnell .................... | B66C 23/48 254/338 |
| 2,198,690 A | * | 4/1940 | Wilmore ............... | A01G 23/043 414/23 |
| 2,247,128 A | * | 6/1941 | Levey ................... | B60P 3/1025 114/344 |
| 2,340,351 A | * | 2/1944 | Thornburg .............. | E21B 7/023 254/394 |
| 2,506,242 A | * | 5/1950 | Shoemaker ............. | B66C 13/18 212/261 |
| 2,704,615 A | * | 3/1955 | Stokes et al. ........... | B66F 9/061 212/261 |
| 2,949,279 A | * | 8/1960 | Eitel ........................ | F16H 7/18 254/397 |

(Continued)

OTHER PUBLICATIONS

Reversaroller Bracket allows you to winch your ATV backwards with a front mounted winch, http://www.reversaroller.com/home/arcticcatstockkevin (Sep. 9, 2010), pp. 1-2.

*Primary Examiner* — Michael E Gallion

(74) *Attorney, Agent, or Firm* — Bartony & Associates, LLC

(57) ABSTRACT

A method of connecting a cable of a winch mounted on a front of a vehicle to an object to the rear of the vehicle includes removably placing a first support member including a first cable guide member extending from the first support member on a first surface of the vehicle so that the first support member contacts the surface of the vehicle. The method further include extending the cable from the winch rearward to be seated in the first cable guide member and to extend rearward therefrom. The method also include connecting the cable to the object to the rear of the vehicle.

17 Claims, 6 Drawing Sheets

(56) References Cited

U.S. PATENT DOCUMENTS

| | | | | |
|---|---|---|---|---|
| 2,967,635 A * | 1/1961 | Barnett | B60P 3/1016 | 414/462 |
| 3,048,291 A * | 8/1962 | Mabry | B60P 3/1025 | 414/462 |
| 3,128,893 A * | 4/1964 | Jones | B60P 3/1025 | 414/462 |
| 3,387,727 A * | 6/1968 | Micheel | B60P 3/1025 | 414/462 |
| 3,435,970 A * | 4/1969 | Sutton | B60P 3/1025 | 414/462 |
| 3,531,006 A * | 9/1970 | Farchmin | B60R 9/042 | 414/462 |
| 3,608,759 A * | 9/1971 | Spurgeon | B60R 9/0426 | 414/462 |
| 3,612,314 A | 10/1971 | Cooper | | |
| 3,712,524 A * | 1/1973 | Ames, Sr. | B60P 3/1025 | 224/310 |
| 3,762,584 A * | 10/1973 | Peterson | B66D 1/36 | 172/811 |
| 3,836,029 A | 9/1974 | Ruedebusch | | |
| 3,899,093 A * | 8/1975 | Allen | B66D 1/36 | 254/327 |
| 3,999,673 A * | 12/1976 | Anderson | B60P 3/1016 | 224/310 |
| 4,127,295 A * | 11/1978 | Robinson | B60R 19/48 | 180/7.5 |
| 4,134,509 A * | 1/1979 | Clement | B60R 9/0426 | 224/310 |
| 4,238,116 A * | 12/1980 | Plante | B66D 1/00 | 254/327 |
| 4,907,934 A * | 3/1990 | Holladay | B60P 3/1025 | 224/310 |
| 5,054,745 A * | 10/1991 | Swayze | B66D 1/00 | 242/390.7 |
| 5,154,563 A * | 10/1992 | Phillips | B60R 9/0426 | 224/326 |
| 5,393,194 A * | 2/1995 | Smith | B60P 1/00 | 212/298 |
| 5,447,408 A | 9/1995 | Smith | | |
| 5,769,586 A | 6/1998 | Schulte | | |
| 5,904,463 A * | 5/1999 | Christensen | B60R 9/042 | 224/310 |
| 5,971,177 A | 10/1999 | Carter | | |
| 6,138,992 A * | 10/2000 | Bell | B66D 1/00 | 224/519 |
| 6,517,111 B2 * | 2/2003 | Mizuta | B62D 23/005 | 180/311 |
| 6,672,821 B1 * | 1/2004 | Mc Clam, Jr. | B60R 9/06 | 414/444 |
| 7,618,024 B2 * | 11/2009 | Constant | B60P 1/5471 | 254/394 |
| 7,896,604 B1 * | 3/2011 | Donlin | B66D 1/00 | 212/180 |
| 8,133,000 B2 | 3/2012 | Olson | | |
| 8,376,684 B2 | 2/2013 | Juarez-Ortega | | |
| 8,602,393 B1 * | 12/2013 | Huffman | B60P 1/548 | 212/179 |
| 8,602,394 B2 * | 12/2013 | Christiansen | B66D 1/36 | 254/323 |
| 9,783,398 B1 * | 10/2017 | Dartlon | B60P 1/04 | |
| 2011/0110753 A1 * | 5/2011 | Dieziger | B60P 1/00 | 414/538 |
| 2012/0107076 A1 | 5/2012 | Lieber | | |
| 2013/0037768 A1 * | 2/2013 | Hayes | B66C 23/48 | 254/327 |
| 2016/0221807 A1 * | 8/2016 | Kleinatland | B66D 1/12 | |

* cited by examiner

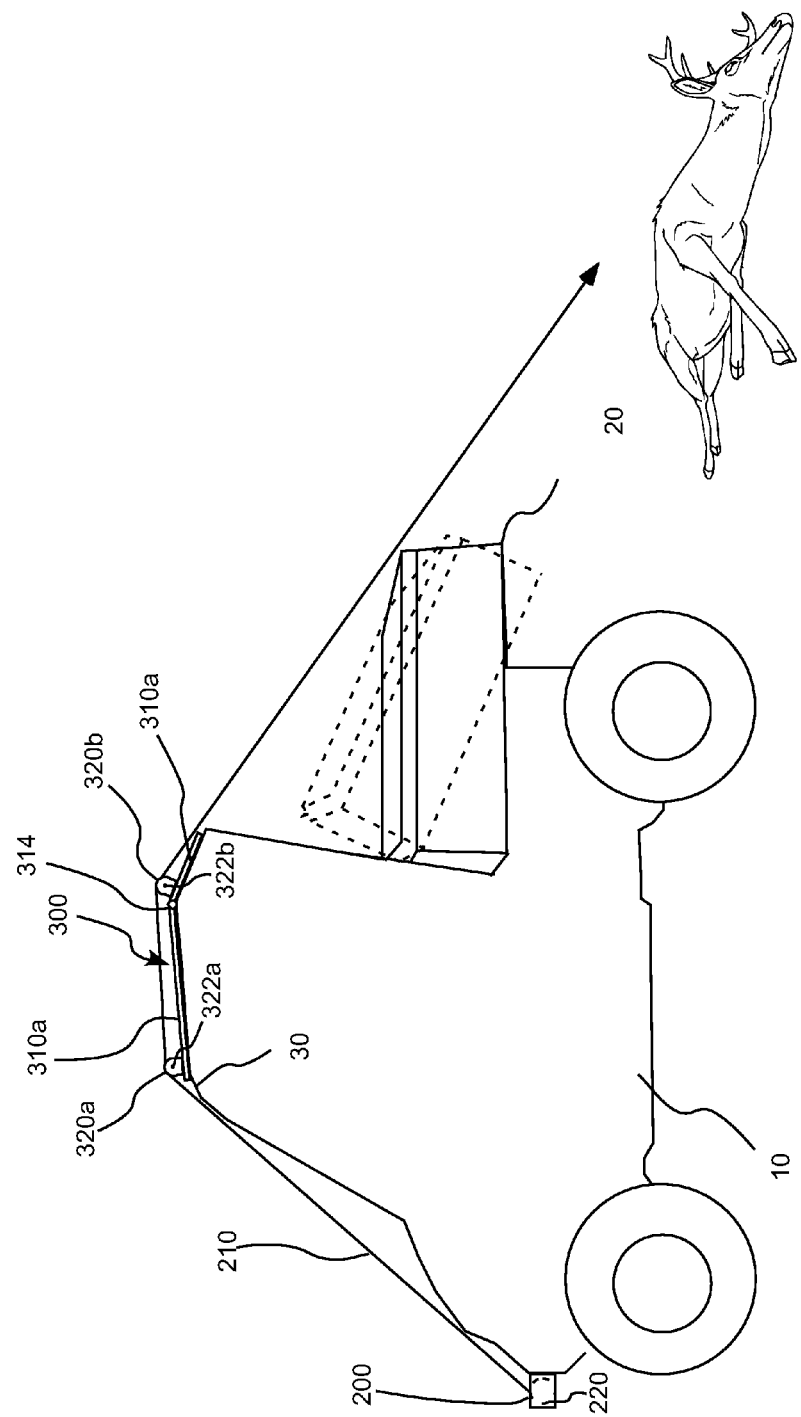

ADAPTATION OF A FRONT WINCH DEVICE ON A VEHICLE TO RAISE A LOAD TO THE REAR OF A VEHICLE

CROSS-REFERENCE TO RELATED APPLICATION

This application claims benefit of U.S. Provisional Patent Application Ser. No. 62/153,160, filed Apr. 27, 2015, the disclosure of which is incorporated herein by reference.

BACKGROUND

The following information is provided to assist the reader in understanding technologies disclosed below and the environment in which such technologies may typically be used. The terms used herein are not intended to be limited to any particular narrow interpretation unless clearly stated otherwise in this document. References set forth herein may facilitate understanding of the technologies or the background thereof. The disclosure of all references cited herein are incorporated by reference.

A winch is a mechanical device used to pull in, let out, or otherwise adjust the tension of a rope or wire cable. A winch may, for example, include a drum, spool or barrel a about which the rope or wire cable is windable. The winch may further include manually operated crank or a powered device in operative connection with the drum to control winding of the rope or wire cable therearound.

In a typical winch, an electric motor may provide power to a reduction gear mechanism, which turns the winch drum and winds a wire rope. A brake automatically engages the winch drum when the winch motor is stopped and there is load on the wire rope. A clutch allows the winch drum to be disengaged from the drive train to enable the drum to rotate freely. Electrical controls, which may include a remote control, are provided to allows a user to operate the winch.

Winches may, for example, be mounted to the front or rear of vehicles. Very often, winches are mounted to the front of vehicles to, for example, to pull a vehicle out of a stuck position or over rough terrain. A winch may also be used to move or apply force to objects. Trucks, All Terrain Vehicles (ATVs), Utility Task Vehicles (UTVs) and similar vehicles are often provided with a front mounted winch (that is, a winch mounted to the front of a vehicle).

SUMMARY

In one aspect, a method of connecting a cable of a winch mounted on a front of a vehicle to an object to the rear of the vehicle includes removably placing a first support member including a first cable guide member extending from the first support member on a first surface of the vehicle so that the first support member contacts the surface of the vehicle. The method further include extending the cable from the winch rearward to be seated in the first cable guide member and to extend rearward therefrom. The method also include connecting the cable to the object to the rear of the vehicle.

The method may further include removably placing a second support member comprising a second cable guide member extending from the second support member on a second surface of the vehicle to the rear of the first support member; and extending the cable from the first cable guide member rearward to be seated in the second cable guide member and to extend rearward therefrom before connecting the cable to the object to the rear of the vehicle.

In a number of embodiments, the cable does not contact the vehicle between the winch and the first cable guide member when the cable is drawn taut thereover and the cable does not contact the vehicle between the first cable guide member and the second cable guide member when the cable is draw taut over the first cable guide member and the second cable guide member.

In a number of embodiments, the vehicle includes a rearward cargo compartment and the method further includes activating the winch after connecting the cable to the object to the rear of the vehicle to lift the object to the rear of the vehicle into the cargo compartment.

The first cable guide member may, for example, include a first pulley wheel and the second cable guide member may, for example, include a second pulley wheel, wherein the first pulley wheel and the second pulley wheel rotate upon activating the winch.

In a number of embodiments, the first support member and the second support member are movably connected. The first support member may, for example, be connected to the second support member such that the first support member is rotatable relative to the second support member. In a number of embodiments, the vehicle is a utility task vehicle and the first surface and the second surface of the utility task vehicle are portions of the roof thereof.

In a number of embodiments, a lower surface of the first support member rests freely on the first surface when the first support member is in operative connection with the first surface and the first cable guide member extends from an upper surface of the first support member. A lower surface of the second support member may also rest freely on the second surface when the second support member is in operative connection with the first surface and the second cable guide member extends from an upper surface of the second support member. As used herein, the phrase "rests freely on" indicates that the support member is not interconnected with the surface of the vehicle via, for example, any connector during use thereof which must be removed to remove the support member from contact with the surface. The support member simply rests on the surface.

In another aspect, a system for connecting a cable of a winch mounted on a front of a vehicle to an object to the rear of the vehicle, includes a first support member including a first cable guide member extending from the first support member. The first support member is adapted to be removably placed on a surface of the vehicle so that the first support member contacts the surface of the vehicle. The system may further include a second support member including a second cable guide extending from the second support member. The second support member is adapted to be removably placed on a surface of the vehicle to the rear of the first support member so that the first support member contacts the surface of the vehicle.

In a number of embodiments, the first cable guide member is adapted so that, after placement of the first support member on the first surface of the vehicle, the cable does not contact the vehicle between the winch and the first cable guide member when the cable is draw taut over the first cable guide member. The second cable guide member may be adapted so that, after placement of the second support member on the second surface of the vehicle, the cable does not contact the vehicle between the first cable guide member and the second cable guide member when the cable is draw taut over the first cable guide member and the second cable guide member.

In a number of embodiments, the first cable guide member includes a first pulley wheel and the second cable guide member comprises a second pulley wheel. The first support member may, for example, be connected to the second support member so that the second support member can be rotated relative to the first support member.

In a number of embodiments, the lower surface of the first support member is adapted to rest freely on the first surface when the first support member is in operative connection with the first surface, and the first cable guide member extends from an upper surface of the first support member. In a number of embodiments, a lower surface of the second support member is adapted to rest freely on the second surface when the second support member is in operative connection with the first surface, and the second cable guide member extends from an upper surface of the second support member.

The present devices, systems, and methods, along with the attributes and attendant advantages thereof, will best be appreciated and understood in view of the following detailed description taken in conjunction with the accompanying drawings.

BRIEF DESCRIPTION OF THE DRAWINGS

FIG. 1 illustrates side view of a UTV or side-by-side including an embodiment of a system hereof to adapt or convert a front-mounted winch to operate upon an object to the rear of the vehicle.

DETAILED DESCRIPTION

Figure 2A:
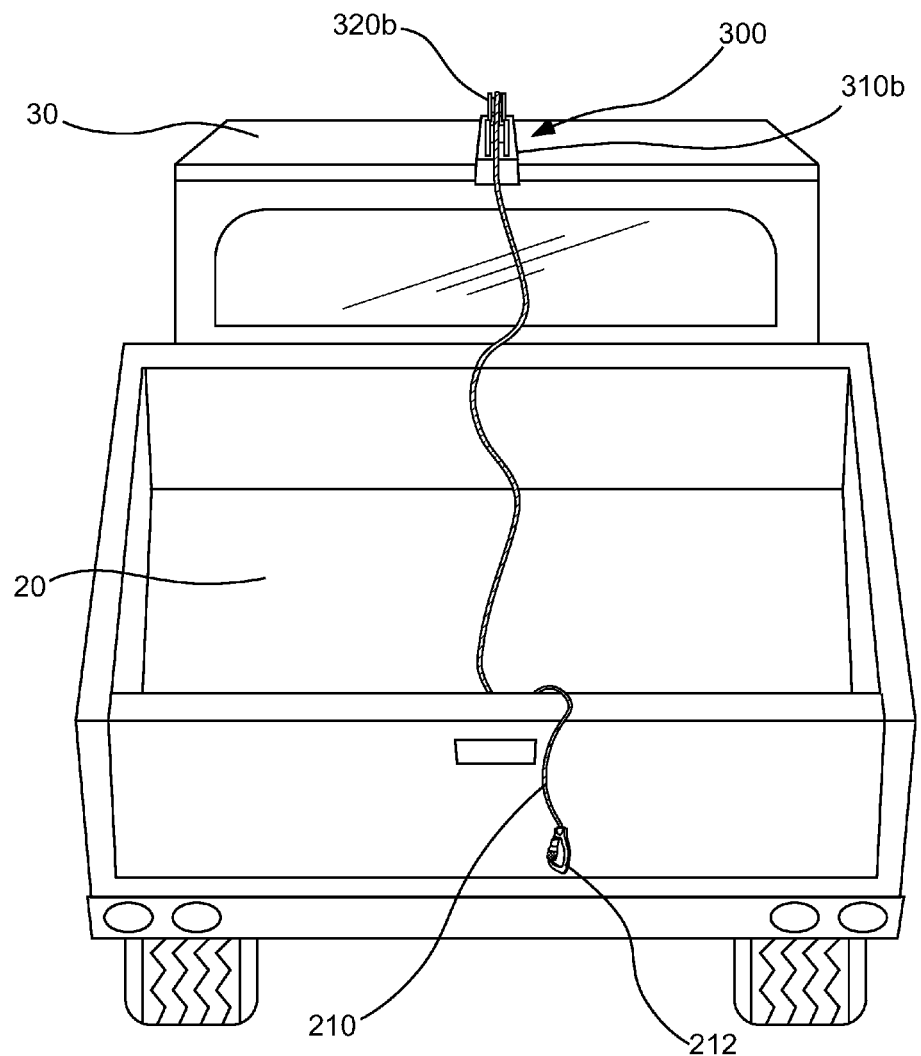
FIG. 2A illustrates a rear perspective view of the vehicle of FIG. 1 with the cargo box lifted and the system hereof in place.

It will be readily understood that the components of the embodiments, as generally described and illustrated in the figures herein, may be arranged and designed in a wide variety of different configurations in addition to the described representative embodiments. Thus, the following more detailed description of the representative embodiments, as illustrated in the figures, is not intended to limit the scope of the embodiments, as claimed, but is merely illustrative of representative embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As used herein and in the appended claims, the singular forms "a," "an", and "the" include plural references unless the context clearly dictates otherwise. Thus, for example, reference to "cable guide member" includes a plurality of such cable guide members and equivalents thereof known to those skilled in the art, and so forth, and reference to "the cable guide member" is a reference to one or more such cable guide members and equivalents thereof known to those skilled in the art, and so forth. Recitation of ranges of values herein are merely intended to serve as a shorthand method of referring individually to each separate value falling within the range. Unless otherwise indicated herein, and each separate value, as well as intermediate ranges, are incorporated into the specification as if individually recited herein. All methods described herein can be performed in any suitable order unless otherwise indicated herein or otherwise clearly contraindicated by the text.

FIG. 1 illustrates side, schematic view of a UTV or side-by-side vehicle 10 including an embodiment of a system 100 in operative connection therewith. System 100 adapts or converts a front-mounted winch 200 of vehicle 10 to operate upon an object to the rear of the vehicle. A side-by-side is, for example, a small, two-person or six-person, four-wheel drive, off-road vehicle, also called a UTV or ROV (Recreational Off highway Vehicle). Side-by-sides such as vehicle 10 have a side-by-side seating arrangement. Vehicle 10 includes a bed or cargo box 20 at the rear of vehicle 10. As illustrated in broken lines in FIG. 1, cargo box 20 may be lifted or inclined in the manner of a dump trailer.

In a number of embodiments, devices, systems and methods hereof operate to convert or adapt a front mounted winch such as winch 200 to operate on an object or objects to the rear of a vehicle upon which the winch is mounted. As illustrated, for example, in FIG. 1 a connective line in, for example, the form of a rope, wire cable or steel cable 210 (as known in the winch arts) from winch 200 is directed over vehicle 10 via a system 300. System 300 may, for example, operate to prevent contact or pinch points between cable 210 and the surface of vehicle 10.

Figure 2B:
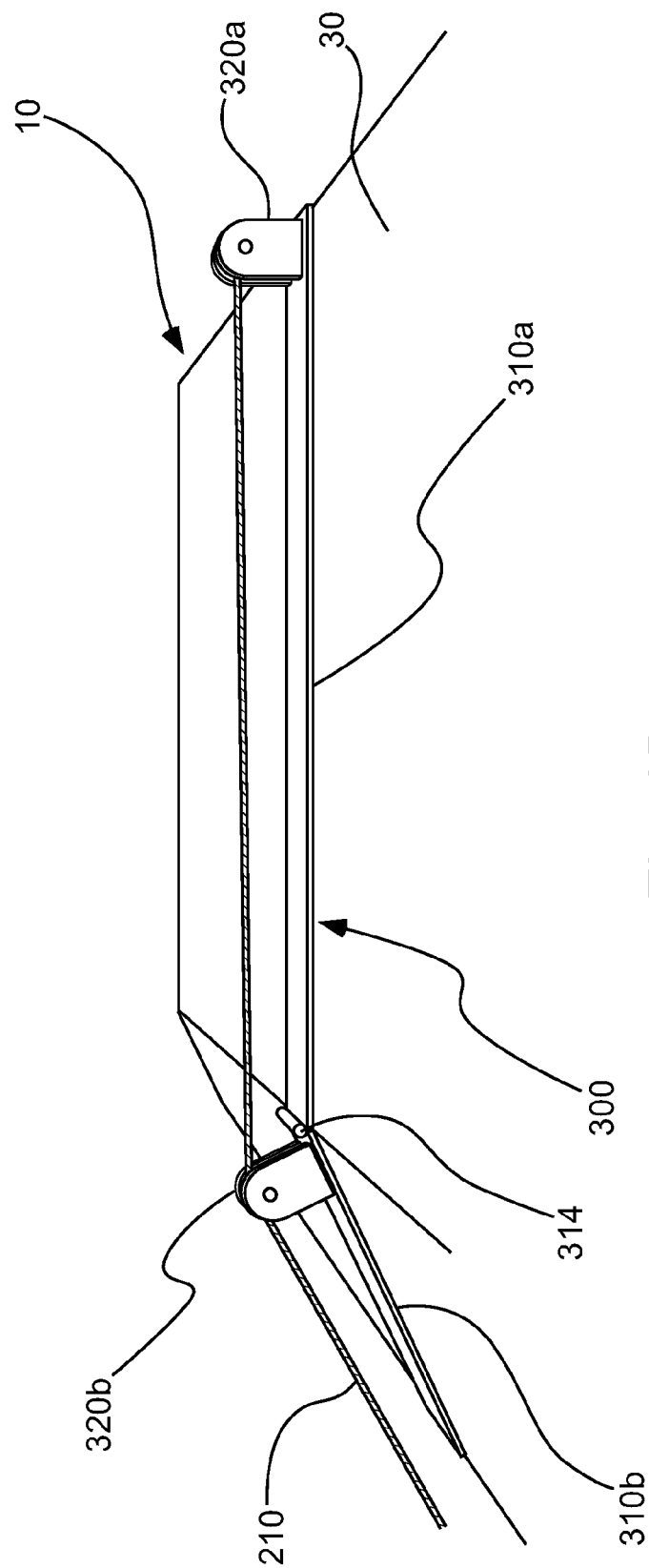
FIG. 2B illustrates a perspective view of the roof of the vehicle of FIG. 1 with the system hereof in place.
Figure 3:
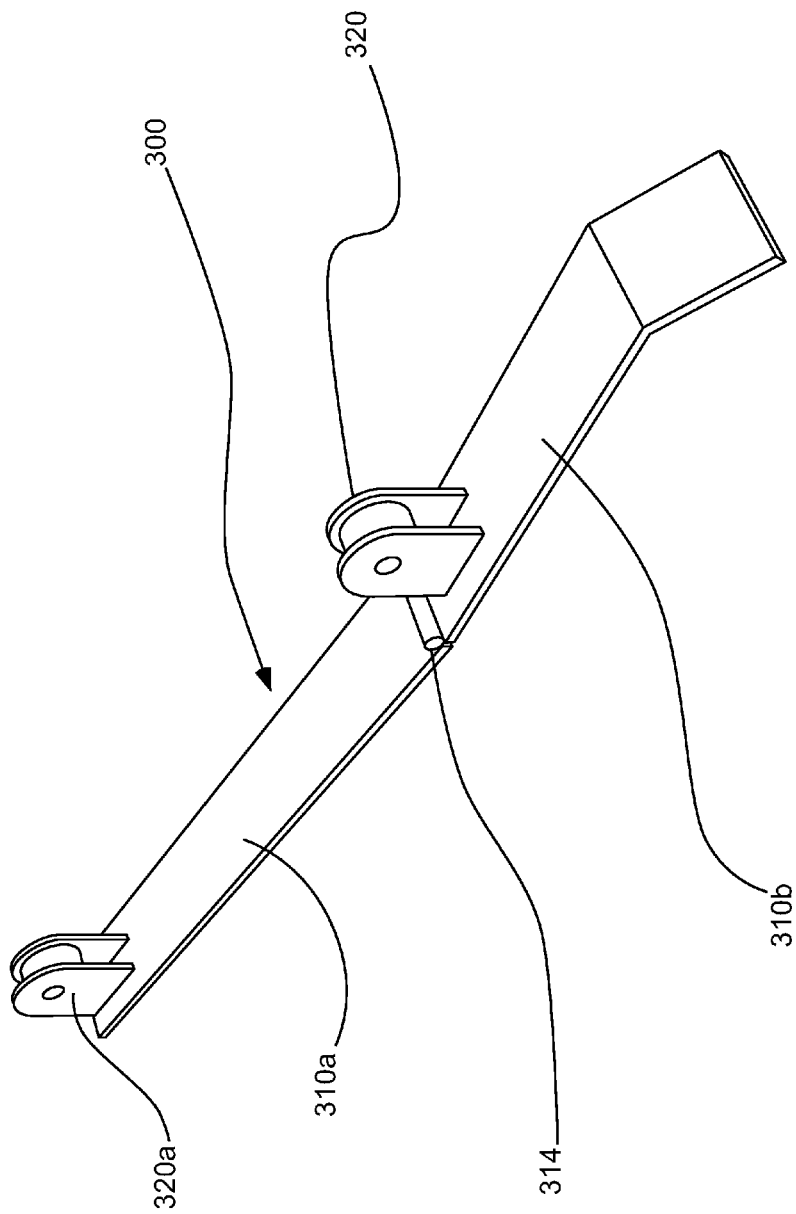
FIG. 3 illustrates a perspective view of the system of FIG. 1.

In the illustrated embodiment of FIGS. 1 through 3, system 300 includes an assembly including a first support member 310a and a second support member 320 which are movably (for example, rotatably connected) via, for example, a hinge 314. This conformation allows system 300 to conform to the roof contour or shape of vehicle 10. A first or lower surface of first support member 310a contacts the roof of vehicle 10. Contact member may be provided on the ends of support member hereof to, for example, contact an end of a roof or other vehicle component, but are not required. First support member 310a includes or has connected thereto a first line/cable guide member 320a extending from an upper or second surface (opposite the first surface thereof) of support member 310a which contacts cable 210 and guides cable 210. First guide member 320a in a number of embodiments includes a rotatable wheel such as a pulley wheel which rotates about axis 322a. As known in the pulley arts, a pulley wheels includes a channeled or grooved surface (that is, a curved channel between two flanges) to seat/guide cable 210. Providing a rotating element to contact cable 210 in first guide member 320a (such as a pulley wheel) assists in minimizing friction and facilitated winding and unwinding of cable 210 around drum 220 of winch 200 and may also assist in limiting shear forces between the support member 310a and the surface of vehicle roof 30.

Similar to first support member 310a, second support member 310b of the assembly includes a first or lower surface which contacts the roof of vehicle 10. Second support member 310b includes or has connected thereto a second line/cable guide member 320b extending from an upper or second surface (opposite the first surface thereof) of second support member 310b, which may be identical to first guide member 320b. Like first guide member 320a, second guide member 320a contacts cable 210 and guides cable 210. In a number of embodiments, second guide member 320b includes a rotatable wheel such as a pulley wheel which rotates about an axis 322b.

Referring to FIGS. 1 through 2B, in use of system 300 in connection with an object to the rear of vehicle 10, one first places system 300 on roof 30 of vehicle 10. Cable 210 is then released, unwound from drum 220 of winch 200 and moved rearward relative to the orientation of vehicle 10 over vehicle 10 so that cable 210 is seated in first guide member 320a and second guide member 320b. Cable 210 is drawn further rearward over cargo box 20 and past the rear tailgate of vehicle 10. Cable guide members 320a and 320b are positioned so that cable 210 does not contact vehicle 10 (other than possibly on the bed of cargo box 30 or tailgate, where slight cosmetic damage, denting or scratching may not be a concern) when cable 210 is drawn taut. In any case, there is preferably no contact of cable 210 with vehicle 10 between the farthest rearward guide member and winch 200. At this point in time, cable 210 is connected to an object to which force is to be applied. Cable 210 can, for example, be connected to the object via a connector 212 as illustrated in FIG. 2A. Winch 200 may then be activated to apply force to the object to move it or to lift it into cargo box 20. Objects of varying weight (for example, 0 to 400 pounds, 0 to 1000 pounds or greater) can readily be lifted into cargo box 20. The surface areas of support members 310a and 310b may, for example, be adjusted (for example, increased) to support more force thereon without damage to vehicle 210. Cargo box 20 can be tilted to inclined when lifting an object into cargo box 20. After the object is which cargo box 20, cargo box 20 may then be placed into its non-inclined, transport position. A ramp or ramps can optionally be used when drawing the object into cargo box 20 or another bed.

Many hunters use UTVs such as vehicle 10 for transportation while hunting. Rather than dragging large game such as a deer, cable 210 can be attached to the deer via connector 212 (for example, by and the neck of the deer or other wild game) and the dear can be drawn into or lifted into cargo box 20 upon activation of winch 200. Use of winch 200 to lift heavy object into a vehicle may, for example, help in preventing injuries to hunters.

As described above, system 300 prevents cable 210 from contacting vehicle 10 when cable 210 is drawn taut during use to apply force to an object. Support members 310a and 310b provide support for cable guide members 320a and 320b and distribute force over a sufficient area to prevent damage to the surface of vehicle 10 (or another vehicle in connection with which the systems hereof are used).

Figure 4:
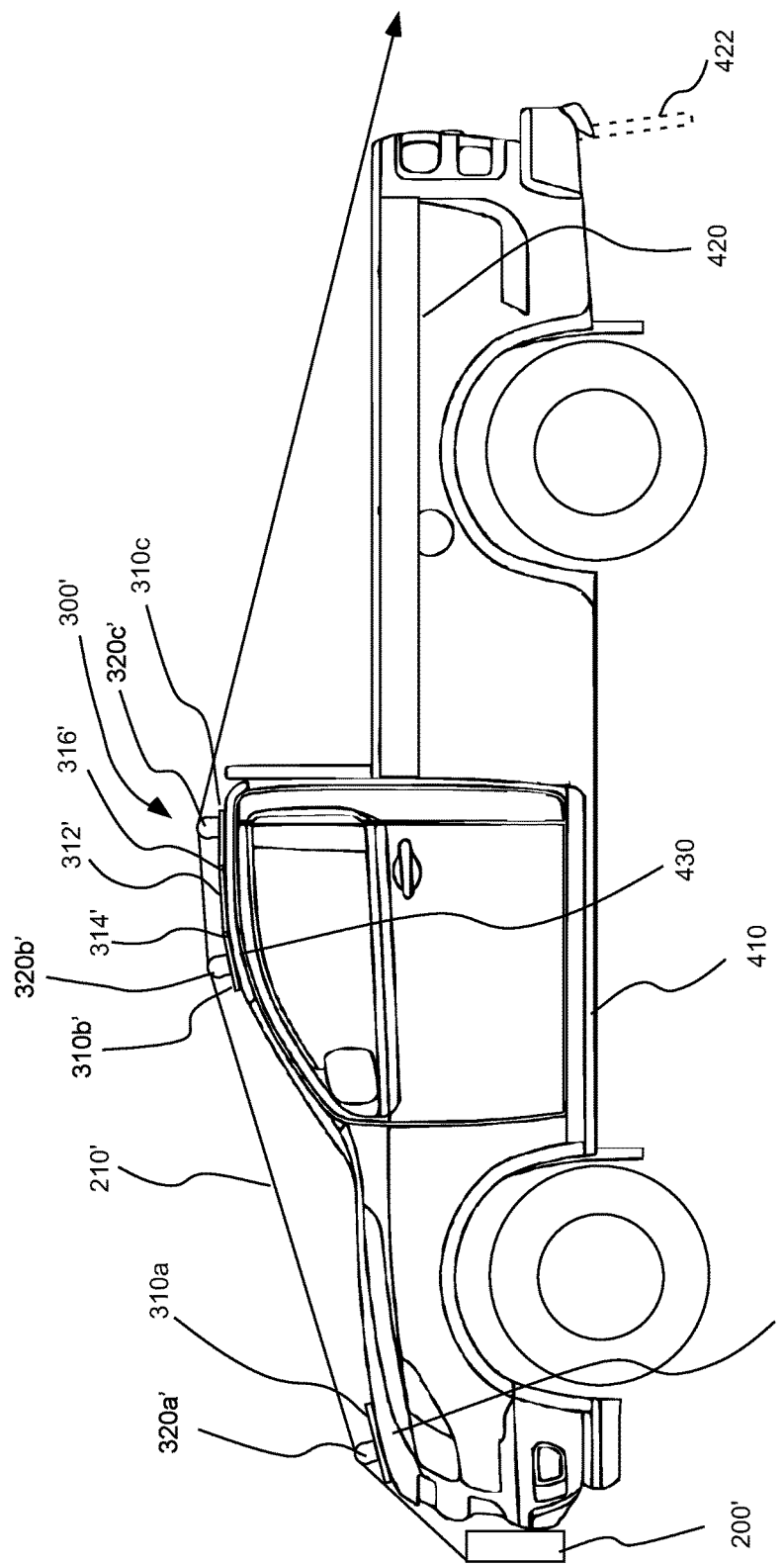
FIG. 4 illustrates another embodiment of a system hereof in place upon a truck.

The system hereof can be adapted or modified for use with virtually any vehicle including a front mounted winch. For example, FIG. 4 illustrates an embodiment of a system 300' hereof for use in connection with a vehicle/truck 410. In this embodiment, system 300' includes a first support member 310a' from which a first (cable) guide member 320a' (for example, a pulley wheel as described above) extends. First support member 320b' is placed on hood 440 of vehicle 410. System 300' further includes a second support member 310b' from which a second guide member 320b' (for example, a pulley wheel) extends and a third support member 310c' from which a third guide member 320c' (for example, a pulley wheel) extends. In the illustrated embodiment second support member 310b' and third support member 310c are connected via an intermediate member 312' and hinging connectors 314' and 316' so that the assembly thereof conforms to the contour of roof 430 of vehicle 410. As illustrated in FIG. 4, cable 210' of a front-mounted winch 200 is drawn rearward to pass over/through guide members 320a', 320b' and 320c', and then to pass over bed 420 and the rear tailgate 422 of vehicle 410 so that cable 210' does not contact areas of vehicle 410 that are desirable to be protected from damage. In many trucks, rear tailgate 422 can be readily removed or released to swing to a wide angle (as illustrated in FIG. 4) to further facility use of system 300' hereof.

Figure 5:
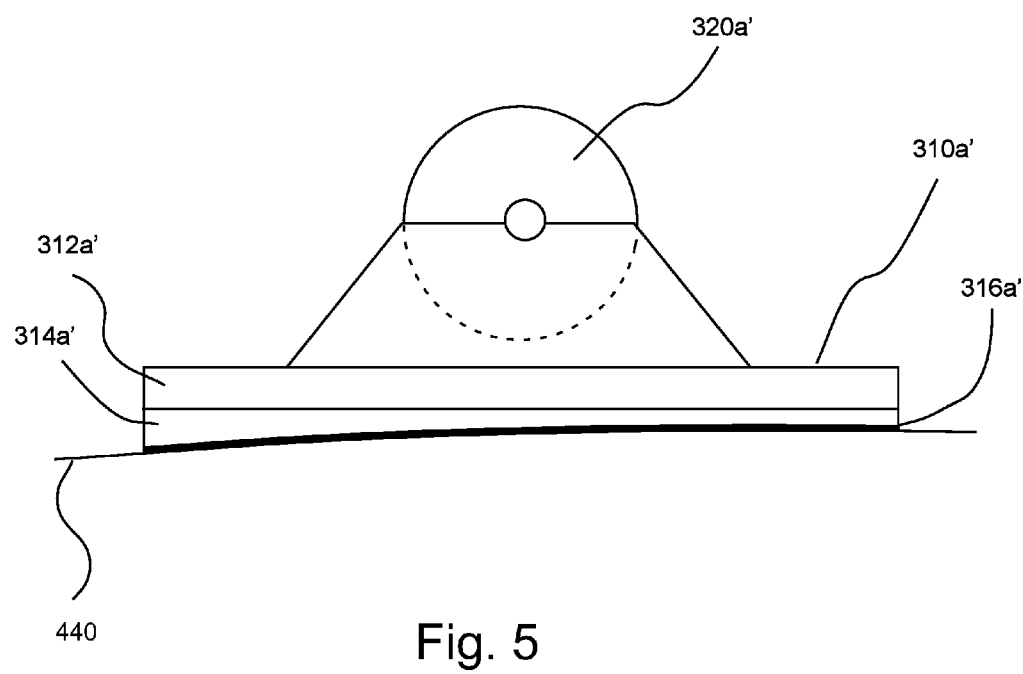
FIG. 5 illustrates an enlarged side view of an assembly or component of the system of FIG. 4.

FIG. 5 illustrates an enlarged view of an embodiment of first support member 310a'. In the illustrated embodiments, first support member 310a' includes a first or upper member 312a' which may be formed from a high-strength material such as a metal. First guide member 320a' is attached to and supported by upper member 312a'. A second or intermediate member 314a' is attached to a lower surface of first member 312a. Second member 314a may, for example, be made from a resilient material (for example, a polymer foam) to assist in conformation of first support member 310a to hood 440 of vehicle 410. A third or lower member 316a' is attached to the bottom surface of second member 314a'. Third member 316a may, for example, be formed from a flexible material which may assist in preventing damage to hood 440 and/or forming a stable (non-slipping) connection between first support member 310a and hood 440.

When not in use, the components, assembly and/or assemblies of the systems hereof can simply be removed from their resting positions on the vehicle and stored for later use. In a number of embodiments, the support member or members of the systems hereof simply rest upon a surface or surfaces of the vehicles. As no cooperating connectors are required in a number of the embodiment described herein, no tools are required to place the systems hereof in operative connection with the vehicle or to remove the system from operative connection with the vehicle. Once again, the one or more support members of the system may simply rest upon the surface of the vehicle. A portion of the a system hereof may, for example, be designed to cooperate with a portion of a vehicle in an engaging (for example, in a hooking or interconnecting fashion). No structural change is required of the vehicle. A support member of a system hereof may include one or more cable guide members as described herein. Support members hereof may be rigid or exhibit some flexibility. Moreover, the systems hereof are easily stowed in a vehicle for use at any time.

In general, force applied to the cable guide member(s) on a support member while applying force to an object to the rear of the vehicle via the winch cable assists in holding the support member in position. The support member may have sufficient surface area (as readily determined for its position on the vehicle and the operating weight/force range of the system using well-known engineering principles) to distribute the force on the support member in a manner to prevent damage (for example, scratching or denting) to the vehicle surface.

The foregoing description and accompanying drawings set forth a number of representative embodiments at the present time. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A method of connecting a cable of a winch mounted on a front of a vehicle, which includes a rearward cargo compartment, to an object to the rear of the vehicle, comprising:
   removably placing a first support member comprising a first cable guide member extending from the first support member on a first area of the surface of the vehicle so that the first support member rests on the first area of the surface of the vehicle without interconnection between the first support member and the surface of the vehicle via a mechanical fastening connector;
   removably placing a second support member comprising a second cable guide member extending from the second support member on a second surface of the vehicle to the rear of the first support member;
   extending the cable from the winch rearward to be seated in the first cable, to be seated in the second cable guide member and to extend rearward therefrom before connecting the cable to the object to the rear of the vehicle;
   connecting the cable to the object to the rear of the vehicle; and
   activating the winch after connecting the cable to the object to the rear of the vehicle to lift the object to the rear of the vehicle into the cargo compartment.

2. The method of claim 1 wherein the first support member and the second support member are connected.

3. The method of claim 1 wherein the cable does not contact the vehicle between the winch and the first cable guide member when the cable is drawn taut thereover and the cable does not contact the vehicle between the first cable guide member and the second cable guide member when the cable is draw taut over the first cable guide member and the second cable guide member.

4. The method of claim 1 wherein the first support member and the second support member are rotatably connected.

5. The method of claim 1 wherein the first cable guide member comprises a first pulley wheel and the second cable guide member comprises a second pulley wheel, the first pulley wheel and the second pulley wheel rotating upon activating the winch.

6. The method of claim 5 wherein the first support member and the second support member are movably connected.

7. A method of connecting a cable of a winch mounted on a front of a vehicle to an object to the rear of the vehicle, comprising:
   removably placing a first support member comprising a first cable guide member extending from the first support member on a first area of the surface of the vehicle so that the first support member rests on the first area of the surface of the vehicle without interconnection between the first support member and the surface of the vehicle via a mechanical fastening connector;
   removably placing a second support member comprising a second cable guide member extending from the second support member on a second area of the surface of the vehicle to the rear of the first support member;
   wherein the first support member is connected to the second support member such that the first support member is rotatable relative to the second support member
   extending the cable from the winch rearward to be seated in the first cable guide member, to seated in the second cable guide member and to extend rearward therefrom before connecting the cable to the object to the rear of the vehicle; and
   connecting the cable to the object to the rear of the vehicle.

8. The method of claim 6 wherein the vehicle is a utility task vehicle and the first area of the surface and the second area of the surface of the utility task vehicle are portions of the roof thereof.

9. The method of claim 1 wherein a lower surface of the first support member conforms to a contour of the first area of the surface.

10. The method of claim 3 wherein a lower surface of the second support member rests on the second area of the surface of the vehicle without interconnection between the second support member and the surface of the vehicle via a mechanical fastening connector and the second cable guide member extends from an upper surface of the second support member.

11. A system for connecting a cable of a winch mounted on a front of a vehicle to an object to the rear of the vehicle, comprising:
    a first support member comprising a first cable guide member extending from the first support member, the first support member being adapted to be removably placed on a first area of a surface of the vehicle so that the first support member rests on the first area of the surface of the vehicle without interconnection between the first support member and the surface of the vehicle via a mechanical fastening connector when the cable is in operative connection with the first cable guide member; and
    a second support member comprising a second cable guide extending from the second support member, the second support member being adapted to be removably placed on a second area of the surface of the vehicle to the rear of the first support member so that the second support member rests on the second surface of the vehicle without interconnection between the second support member and the surface of the vehicle via a mechanical fastening connector when the cable is in operative connection with the second cable guide member, wherein the first support member is connected to the second support member so that the second support member can be rotated relative to the first support member.

12. The system of claim 11 further comprising a hinge connecting the first support member and the second support member.

13. The system of claim 11 wherein the first cable guide member is adapted so that, after placement of the first support member on the first area of the surface of the vehicle, the cable does not contact the vehicle between the winch and the first cable guide member when the cable is draw taut over the first cable guide member, and wherein the second cable guide member is adapted so that, after placement of the second support member on the second area of the surface of the vehicle, the cable does not contact the vehicle between the first cable guide member and the second cable guide member when the cable is draw taut over the first cable guide member and the second cable guide member.

14. The system of claim 11 wherein the first cable guide member comprises a first pulley wheel and the second cable guide member comprises a second pulley wheel.

15. The system of claim 11 wherein the vehicle is a utility task vehicle and the first area of the surface and the second area of the surface of the utility task vehicle are portions of the roof thereof.

16. The system of claim 11 wherein a lower surface of the first support member conforms to a contour of the first area of the surface of the vehicle.

17. The system of claim 11 wherein a lower surface of the second support member conforms to a contour of the second area of the surface of the vehicle.

\* \* \* \* \*